United States Patent Office 2,895,923
Patented July 21, 1959

2,895,923

AMINOTRIAZINE MODIFIED POLYACETALS

Bernard H. Kress, Lafayette Hill, Pa., assignor to Quaker Chemical Products Corporation, Conshohocken, Pa., a corporation of Pennsylvania No Drawing. Application November 30, 1956
Serial No. 625,241

7 Claims. (Cl. 260—2)

This invention relates to the preparation of polyacetals which are modified with minor amounts of aminotriazines and to the use of these condensation products in the modification of textile fabrics, especially cellulosic textile fabrics, in order to achieve resilience, dimensional stability and crease recovery with minimum losses to tensile strength.

The use of formaldehyde to form condensation products of aminotriazine has been described in U.S. Patent 2,197,357 and U.S. Patent 2,191,362. These products have found considerable industrial application for textile finishing as well as numerous other purposes.

The use of minor quantities of melamine to modify other resinous condensation products is not novel. In fact, Austrian Patent 101,293, dated 1922, discloses compositions in which ureaformaldehyde resins are modified with melamine. Glycols have also been used to modify melamine resins to yield relatively water-insoluble resins suitable for coating compositions and printing ink formulation as described in U.S. Patent 2,358,276. In this patent a melamine-formaldehyde resin is first formed and is subsequently etherified by reaction with either ethylene glycol, diethylene glycol or propylene glycol. These resins show limited water solubility. The limiting molar ratios of melamine to glycol as set forth in this patent are 1:2 to 1:4.

I have found that I may modify polyacetals of dialkylene and polyalkylene glycols with minor amounts of triazines to obtain water-soluble condensation products which impart useful properties to cellulosic textile fabrics when applied thereto and cured in finishing operations. It is essential that I first form an intermediate polyacetal or hemiacetal prior to reacting same with a triazine. In this manner triazine modification of the intermediate is ensured as well as formation of a water-soluble condensation product. Dimensional control of cotton fabrics may be obtained utilizing the triazine modified acetals of my invention with little loss of tensile strength in such textile treatment. Furthermore, the condensation products obtained according to this invention cause virtually no chlorine retention on fabrics so treated. Still another advantage of these condensation products is their storage stability. Various condensation products prepared as described below have shown no change in physical properties for over 18 months.

The condensation products prepared according to this invention differ markedly in composition and properties from any of those disclosed in the aforementioned patents and in fact most closely resemble the polyacetals described in my copending application, Serial No. 403,056, filed January 8, 1954, now Patent No. 2,786,081. Their use also resembles that of those same polyacetals as described in copending applications, Serial No. 403,057 and Serial No. 411,542, filed January 8, 1954, and February 19, 1954, respectively, now Patents No. 2,785,949 and No. 2,785,947, respectively.

I first condense an aldehyde with a polyalkylene glycol and then add a minor quantity of an aminotriazine or mixtures of triamino triazines. The molar ratios of triazine to diethylene glycol in the compositions of this invention range from 1:4.5 to 1:15 with the preferred range from 1:5 to 1:10.

The aminotriazine is then condensed by refluxing under acidic conditions. Excess unreacted aldehyde may be removed along with water of reaction in some of these products by vacuum evaporation or by azeotropic distillation as with a hydrocarbon such as toluene.

The products are usually colorless, viscous liquids which are soluble in water and may be used in conjunction with such standard textile "curing catalysts" as amine salts and magnesium chloride. After an appropriate drying and "curing" cycle, the fabric has imparted to it a full "hand" or characteristic response to physical handling as well as dimensional control toward washing.

The following examples are described in order to indicate suitable procedures for the preparation and application of the products of this invention, the parts being given by weight.

*Example 1*

|   | Parts |
|---|---|
| Paraformaldehyde (91%) | 43 |
| Diethylene glycol | 133 |
| p-Toluene sulfonic acid | 0.3 |
| Water | 40 |

The above mixture was refluxed with stirring until a clear, water-white solution formed. To this solution were added 32 parts of melamine. Heating and stirring under reflux was continued until the melamine went into solution. This reflux continued for 45 minutes. A clear viscous syrup was obtained which was soluble in water.

The use of other triazines is demonstrated below.

*Example 2*

|   | Parts |
|---|---|
| Paraformaldehyde (91%) | 43 |
| Diethylene glycol | 133 |
| p-Toluene sulfonic acid | 0.3 |

The same procedure was followed as in Example 1. To the clear solution, however, were added 33 parts of acetoguanamine. After the acetoguanamine had gone into solution, refluxing was discontinued leaving a clear syrup.

*Example 3*

The same procedure was followed as in the first step of Example 1. However, to the clear acetal solution were added 47 parts of benzoguanamine instead of the melamine there used. After solution the reaction was stopped and a clear syrup was obtained.

Smaller quantities of triazine can also be used in these preparations.

*Example 4*

|   | Parts |
|---|---|
| Diethylene glycol | 159 |
| Paraformaldehyde (91%) | 50 |
| Melamine | 21 |
| p-Toluene sulfonic acid | 0.4 |

The diethylene glycol and paraformaldehyde were heated (in the presence of the p-toluene sulfonic acid) to effect a clear solution. Then the 21 parts of melamine were added to the mixture and heating was continued until a clear solution was obtained.

*Example 5*

|   | Parts |
|---|---|
| Diethylene glycol | 133 |
| Paraformaldehyde (91%) | 43 | were refluxed in the presence of a small amount of sodium hydroxide which adjusted to a pH of 9 to 9.5. The mixture was heated to effect a clear solution. Then the mixture was acidified to a pH of 4.5 with phosphoric acid and to the hemiacetal mixture thus formed 16 g. of melamine were added and heated for 30 minutes. The clear solution containing the melamine modified polyacetal was subjected to partial evaporation in vacuo to remove a portion of the water and free formaldehyde leaving a syrupy liquid.

Example 6

The procedure above was repeated except that melamine was added while the formaldehyde-dialkylene glycol clear reaction mixture was still alkaline. After solution of the melamine the reaction mixture was acidified to a pH of 5 with phosphoric acid and heated for 30 minutes to obtain a clear solution of the melamine modified polyacetal.

Example 7

The procedure in Example 6 was repeated. However, after addition of phosphoric acid to a pH of 6, 30 parts of toluene and 0.2 part of p.toluene sulfonic acid were added. Then water was azeotroped out of the reaction mixture containing the melamine modified polyacetal until 25 parts of water had been distilled. Then toluene was evaporated in vacuo leaving a viscous, light yellow liquid, with virtually no odor.

The products described in the above examples are valuable in textile finishing operations as demonstrated below.

Example 8

Cotton sheeting, 80 square, was padded through solutions made up as described below and placed through the squeeze rolls so that the wet pickup was 100%. The fabric was stretched to premarked dimensions and then dried at 180° F. for 10 minutes. The sheeting was then cured for 5 minutes at 300° F. in a mechanical air convection oven. The testing of the fabric was carried on by evaluating procedures listed in the 1952 Yearbook of the American Association of Textile Chemists and Colorists.

| Solution concentrations | | Warp shrinkage [1] after 1 wash | Warp tensile [2] | Monsanto [3] warp and fill |
|---|---|---|---|---|
| Product | Percent | Percent catalyst | | | |
| Example 1 | 4 | 1% catalyst AC— Monsanto Chem. Co. | −3.4 | 43 | 212 |
| Do | 4 | 0.5% ammonium chloride. | −3.1 | 38 | 214 |
| Do | 12 | 3.0% ammonium hydrochloride. | −1.8 | 39.2 | 211 |
| Water treated | | | −5.1 | 43.5 | 175 |

The fabric treated as in Example 8 showed zero chlorine damage by the AATCC Tentative Test 69–52, p. 88 (1952).
[1] AATCC 1952 Standard Test Method 14–52.
[2] Federal Spec. CCC-T-191B Method 5102–2″ width.
[3] Crease recovery—AATCC, 1952, p. 155. Monsanto tester—tentative 66–52.
Catalyst AC is hydrochloride of 2-aminopropanol-1.

Example 9

The product prepared in Example 3 was applied as in Example 8.

| Product | Percent | Percent | Catalyst | Warp shrinkage | Warp tensile | Hand |
|---|---|---|---|---|---|---|
| Example 3 | 10 | 1.5 | Catalyst AC— Monsanto Chem. Co. | −3.1 | 45.8 | Fairly stiff fabric. |
| Do | 10 | 1.0 | Ammonium hydrochloride. | −2.8 | 40.7 | Do. |
| Untreated fabric | | | | −4.9 | 41.2 | Limp. |

Excellent dimensional control of cotton fabric may be obtained by means of the compounds of this invention, often without serious deterioration of tensile strength. Thus, the preparation in Example 1 was used as described in Example 8.

| Product | Percent | Catalyst | Percent | Warp shrinkage, percent | Warp tensile, lbs. |
|---|---|---|---|---|---|
| Example 1 | 20 | Magnesium chloride. | 3 | 0.3 | 53.6 |
| Untreated fabric | | | | 4.3 | 58.7 |

Thus, a loss of about 8% in tensile strength is obtained, whereas, use of a urea formaldehyde resin would have resulted in about a 25% loss in tensile strength.

The warp shrinkage obtained by use of a urea-formaldehyde resin at the same solids concentration was 0.6 and the warp tensile 43.3 lbs.

Good crease recovery may also be obtained by use of these products.

| Product | Percent | Catalyst | Percent | Warp shrinkage | Monsanto |
|---|---|---|---|---|---|
| Example 1 | 10 | Magnesium chloride. | 3 | −1.1 | 250 |
| Untreated fabric | | | | −4.8 | 141 |

Example 10

These products may be applied to fabrics in conjunction with other finishing agents such as softeners, vinyl resins and the like. They may also be employed with such hydroxyl containing polymers as polyvinyl alcohol, starches, modified starches and the like.

A heavy cotton twill was treated as in Example 8 with the following results:

| Preparation Example 1, percent | Catalyst | Percent | Additive | Percent | Warp shrinkage | Warp tensile |
|---|---|---|---|---|---|---|
| 10 | Magnesium chloride. | 3 | Polyvinyl alcohol. | 1 | −2.4 | 196.2 |
| 10 | do | | Starch ether. | 2 | −2.8 | 193.7 |
| Untreated | | | | | −6.5 | 199 |

Even preparations utilizing only minor amounts of triazine show good dimensional control and crease recovery on fabrics with minimal loss of tensile strength. Cotton sheeting was then treated as in Example 8.

| Product Example 5, Percent | Catalyst magnesium chloride, Percent | Warp shrinkage | Warp tensile, Lbs. | Monsanto |
|---|---|---|---|---|
| 10 | 3 | −1.6 | 37.5 | 238 |
| 15 | 3 | −1.4 | 38.2 | 253 |
| Untreated | | −4.7 | 50.4 | 168 |

The preparation in Example 7 was virtually free of odor during the padding and curing operation.

Example 11

A treatment similar to Example 8 was applied to cotton sheeting in 5% concentration with 2% magnesium chloride as catalyst giving rise to a shrinkage of 2.4% with only a 13.5% loss in tensile strength. The combined warp and fill measurements in the Monsanto reading was 214 compared to 168 for an untreated piece and 4.5% shrinkage on being subjected to a 212° F. wash.

Chlorine retention of fabrics treated as described above was zero by tensile loss tests and no discoloration was observed.

Instead of the diethylene glycol employed in the preceding examples, or in partial replacement thereof, I may use other dialkylene and polyalkylene glycols containing an alkylene radical possessing from 2 to 4 carbon atoms in a straight chain such, for example, as dipropylene glycol, the dibutylene glycols, tripropylene glycol, ditrimethylene glycol, triethylene glycol, tetraethylene glycol, and polyethylene glycols of molecular weights of approximately 400, 600, 1000, 1500, 4000, and the like. Such polyalkylene glycols are commercially available from Carbide & Carbon Chemicals Company under the trade-mark Carbowax. These various polyglycols just mentioned may be used alone or in admixture with each other or with diethylene glycol. Likewise, polyhydric alcohols containing from 3 to 10 carbon atoms and from 3 to 6 hydroxyl groups may be employed in conjunction with the aforesaid glycols. Such polyhydric alcohols include glycerine, pentaerythritol, dipentaerythritol, sorbitol, mannitol, erythritol and the like. When such polyhydric alcohols are used in conjunction with glycols, I prefer to employ them to the extent of not more than 50 mol. percent of the glycol.

Instead of the paraformaldehyde of the above examples, I may use any other appropriate form of formaldehyde such as trioxane, methylol, or aqueous formalin solutions. I may also use other aldehydes, such as acetaldehyde, propionaldehyde, butyraldehyde, crotonaldehyde, valeraldehyde, hexaldehyde, heptaldehyde, and 2-ethyl hexaldehyde or their polymers, precursors or simple acetals. Aromatic aldehydes, such as benzaldehyde and furfural are of use in these preparations. Substituted aldehydes, such as chloroacetaldehyde, hydroxy pivaldehyde and similar halogen and hydroxy substituted aldehyes or acetals may also be used. Aliphatic and aromatic dialdehydes may also be used. Thus, glyoxal, malonaldehyde, succinaldehyde, glutaraldehyde, adipaldehyde, terephthaldehyde, and higher dialdehydes are useful. In addition, I may use their precursors such as dialkoxytetrahydrofuranes and alkoxydihydropyranes or the simple acetals of the dialdehydes in these reactions. Hydroxyaldehydes, such as hydroxyadipaldehyde are also useful in these preparations. In general, I may use any aldehyde containing from 1 to 8 carbon atoms in monomeric form, including heterocyclic aldehydes such as furfural, methyl furfural, ethyl furfural and the like, or carbocyclic aldehydes, such as tetrahydrobenzaldehyde and the corresponding hexahydro compounds.

It is, of course, essential that in utilizing the foregoing equivalents of diethylene glycol and formaldehyde, the proper relationships should be maintained between the polyhydric alcohol, formaldehyde-bearing compound, and triazine. The essential characteristic of this relationship is the use of a molar ratio of triazine to polyalkylene glycol or its equivalent within the range of 1:4.5 to 1:15.

The triazines employed for the purposes of this invention are characterized by the nucleus:

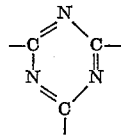

wherein at least one of the free valences is substituted by an amino group. Melamine, acetoguanamine, and benzoguanamine are typical representatives of this class of compounds which are commercially available. Other appropriate triazines which may be used are listed in U.S. Patent 2,197,357, April 16, 1940.

In preparing the condensation products of this invention, I use acidic and potentially acid catalyst, such as metallic halides, for example, zinc chloride, stannic chloride and aluminum chloride, or acids, for example, oxalic acid, diglycolic acid, phosphoric acid, p.toluene sulfonic acid and the like.

Some of the products described herein are useful in stabilization of woolen fabrics. My polyacetals are particularly effective for treating cellulosic materials, such as natural cellulose, regenerated cellulose, hydrolyzed cellulose acetate, paper and paper fibers, regenerated cellulose films, jute, hemp and the like.

As catalyts for curing operations, I may use acidic or potentially acid compounds, such as ammonium salts, for example, diammonium phosphate, ammonium thiocyanate and ammonium chloride, amine salts, metallic salts, for example, magnesium chloride, zinc chloride and zinc nitrate, acids, for example, lactic, tartaric and citric acid, and such catalysts as are normally used in textile finishing operations for the curing of thermosetting resins and cross-linking of cellulose reactants.

I claim:

1. A water-soluble aminotriazine modified polyacetal condensation product comprising the reaction product of a previously prepared acetal selected from the group consisting of acetals and hemiacetals prepared by reacting at elevated temperatures in the presence of an acidic catalyst at least one polyalkylene glycol in which the alkylene radical has from 2 to 4 carbon atoms in a straight chain and at least one aldehyde selected from the group consisting of aliphatic, carbocyclic and heterocyclic aldehydes containing from 1 to 8 carbon atoms in monomeric form, and at least one aminotriazine characterized by the nucleus

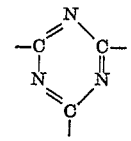

wherein at least one of the free valences is substituted by an NH₂ group, said acetal and aminotriazine being reacted under elevated temperatures, wherein the molar ratio of aminotriazine to polyalkylene glycol is within the range of 1 to 4.5 and 1 to 15, said condensation product containing per molecule at least two polyoxyalkylene radicals derived from said polyalkylene glycol and at least two alkylidene radicals derived from said aldehyde.

2. A water-soluble aminotriazine modified polyacetal condensation product as defined in claim 1, said previously prepared acetal being modified with a polyhydric alcohol containing from 3 to 10 carbon atoms and from 3 to 6 hydroxyl groups.

3. A water-soluble aminotriazine modified polyacetal condensation product comprising the reaction product of a previously prepared acetal selected from the group consisting of acetals and hemiacetals prepared by reacting at elevated temperatures in the presence of an acidic catalyst a dialkylene glycol and formaldehyde, and an aminotriazine characterized by the nucleus

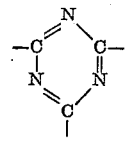

wherein at least one of the free valences is substituted by an NH₂ group, said acetal and aminotriazine being reacted under elevated temperatures, wherein the molar ratio of aminotriazine to the dialkylene glycol is within the range of 1 to 4.5 and 1 to 15, said condensation product containing per molecule at least two polyoxyalkylene radicals derived from said dialkylene glycol and at least two alkylidene radicals derived from said aldehyde.

4. A water-soluble aminotriazine modified polyacetal condensation product comprising the reaction product of a previously prepared acetal selected from the group consisting of acetals and hemiacetals prepared by reacting at elevated temperatures in the presence of an acidic catalyst diethylene glycol and formaldehyde, and melamine, wherein the molar ratio of melamine to the diethylene glycol is within the range of 1 to 4.5 and 1 to 15, said condensation product containing per molecule at least two polyoxyalkylene radicals derived from said diethylene glycol and at least two alkylidene radicals derived from said aldehyde.

5. A water-soluble aminotriazine modified polyacetal condensation product comprising the reaction product of a previously prepared acetal selected from the group consisting of acetals and hemiacetals prepared by reacting at elevated temperatures in the presence of an acidic catalyst diethylene glycol and formaldehyde, and acetoguanamine, wherein the molar ratio of acetoguanamine to the diethyl glycol is within the range of 1 to 4.5 and 1 to 15, said condensation product containing per molecule at least two polyoxyalkylene radicals derived from said diethylene glycol and at least two alkylidene radicals derived from said aldehyde.

6. A water-soluble aminotriazine modified polyacetal condensation product comprising the reaction product of a previously prepared acetal selected from the group consisting of acetals and hemiacetals prepared by reacting at elevated temperatures in the presence of an acidic catalyst diethylene glycol and formaldehyde, and benzoguanamine, wherein the molar ratio of benzoguanamine to the diethylene glycol is within the range of 1 to 4.5 and 1 to 15, said condensation product containing per molecule at least two polyoxyalkylene radicals derived from said diethylene glycol and at least two alkylidene radicals derived from said aldehyde.

7. A cellulosic material treated with the polyacetal as defined in claim 1.

References Cited in the file of this patent

UNITED STATES PATENTS

| | | |
|---|---|---|
| 2,508,875 | Scott | May 23, 1950 |
| 2,577,767 | Jones | Dec. 11, 1951 |

UNITED STATES PATENT OFFICE
CERTIFICATE OF CORRECTION

Patent No. 2,895,923                                                    July 21, 1959

Bernard H. Kress

It is hereby certified that error appears in the printed specification of the above numbered patent requiring correction and that the said Letters Patent should read as corrected below.

Column 3, line 52, Example 8, in the table, third column thereof, for "hydrochloride" read -- chloride --; line 71, Example 9, in the table, fourth column thereof, strike out "hydro-"; column 7, line 12, for "diethyl" read -- diethylene --.

Signed and sealed this 3rd day of November 1959.

(SEAL)
Attest:

KARL H. AXLINE
Attesting Officer

ROBERT C. WATSON
Commissioner of Patents